United States Patent

Burrows et al.

Patent Number: 5,974,933
Date of Patent: Nov. 2, 1999

[54] DEPTH GAUGE FOR A CUTTER

[75] Inventors: James O. Burrows, Gladstone; Randall D. Jensen, Oregon City; Kent L. Huntington, Molalla; Robert J. Penberthy, Gladstone, all of Oreg.

[73] Assignee: Blount, Inc., Montgomery, Ala.

[21] Appl. No.: 08/850,992

[22] Filed: May 5, 1997

Related U.S. Application Data

[63] Continuation-in-part of application No. 08/338,344, Nov. 14, 1994, Pat. No. 5,666,871.

[51] Int. Cl.⁶ .................................................. B27B 33/14
[52] U.S. Cl. .................................. 83/834; 83/830; 83/846
[58] Field of Search .......................... 83/834, 846, 835, 83/839, 850, 851, 852, 853, 854, 831, 832, 833

[56] References Cited

U.S. PATENT DOCUMENTS

| | | |
|---|---|---|
| 2,947,331 | 8/1960 | Irgens . |
| 4,348,927 | 9/1982 | Olmar . |
| 4,590,836 | 5/1986 | Doiron . |
| 4,625,610 | 12/1986 | Petrovich . |
| 4,813,323 | 3/1989 | Harfst . |
| 4,911,050 | 3/1990 | Nitschmann . |
| 4,989,489 | 2/1991 | Pinney . |
| 5,085,113 | 2/1992 | Pinney . |
| 5,165,318 | 11/1992 | Wesley . |

FOREIGN PATENT DOCUMENTS

| | | |
|---|---|---|
| 903642 | 6/1972 | Canada . |
| 44099 | 2/1961 | Poland . |

Primary Examiner—M. Rachuba
Attorney, Agent, or Firm—Klarquist Sparkman Campbell Leigh & Whinston, LLP

[57] ABSTRACT

A depth gauge leading the cutting edge in a cutter device has a body portion disposed in a substantially upright plane. The depth gauge includes a top plate portion cantilevered laterally over the body. A juncture section joins the depth gauge plate portion to the body of the cutter and is deformed intermediate its front and rear ends to strengthen the depth gauge against breakage.

36 Claims, 8 Drawing Sheets

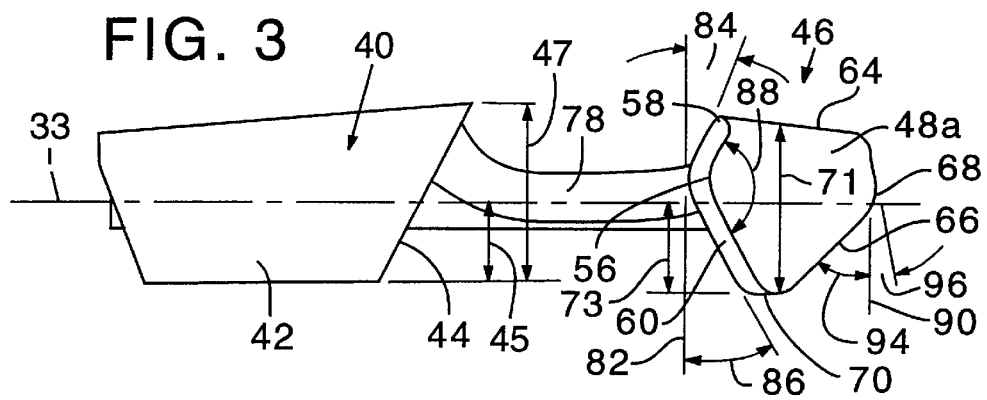
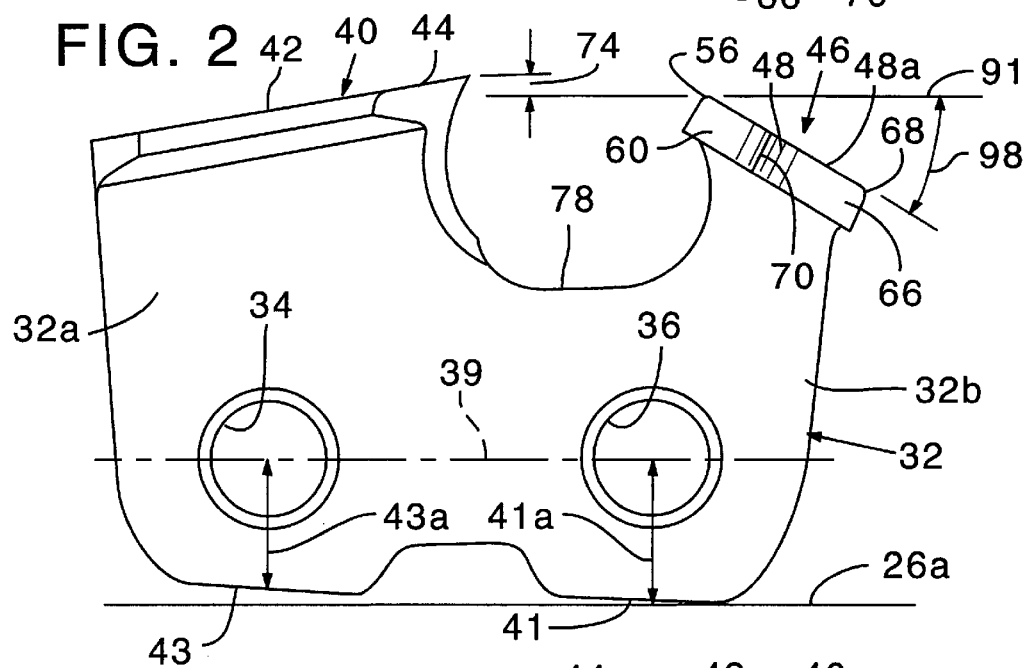
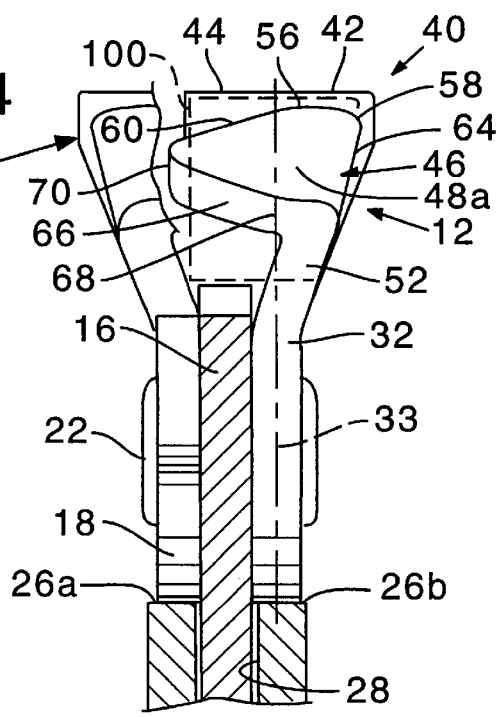

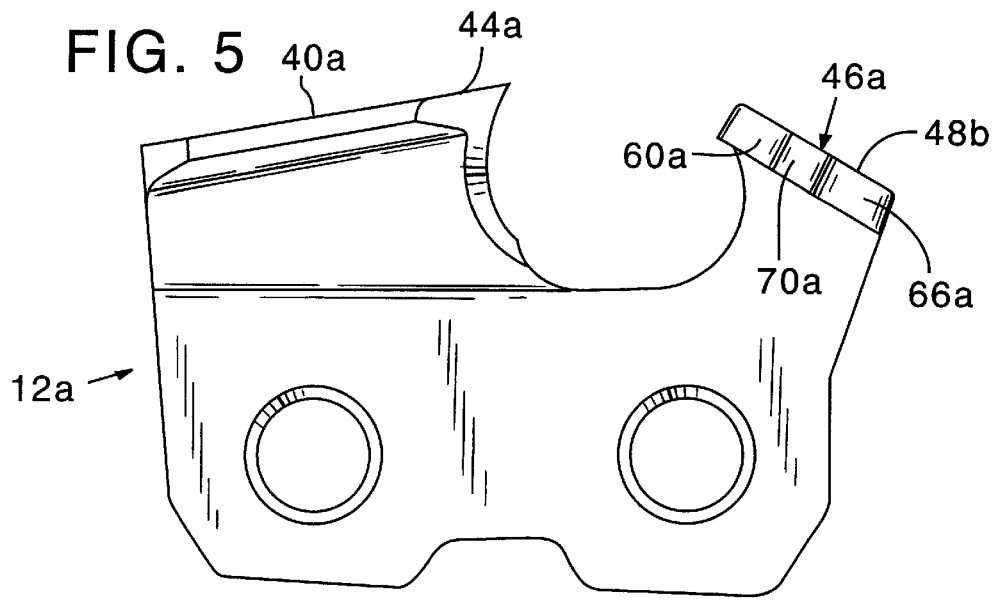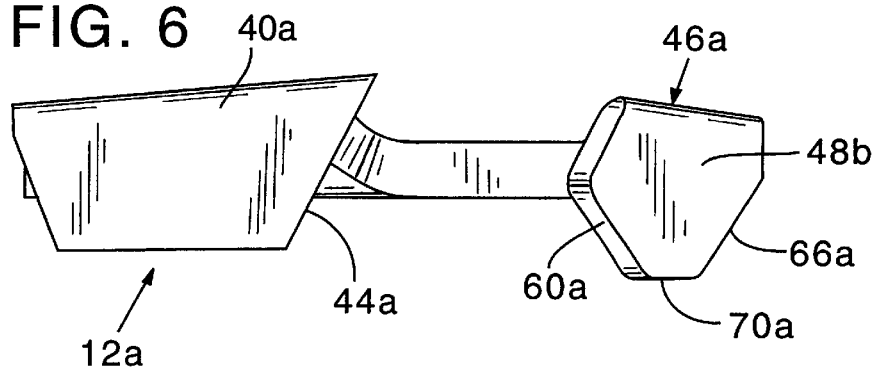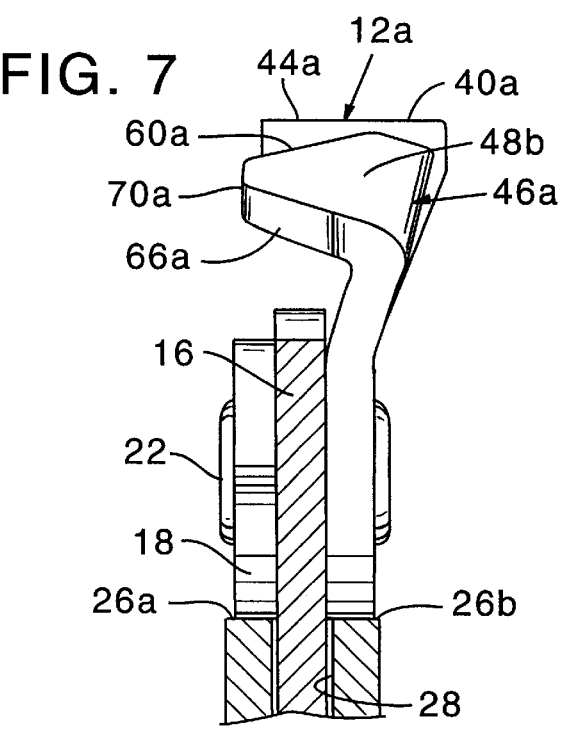

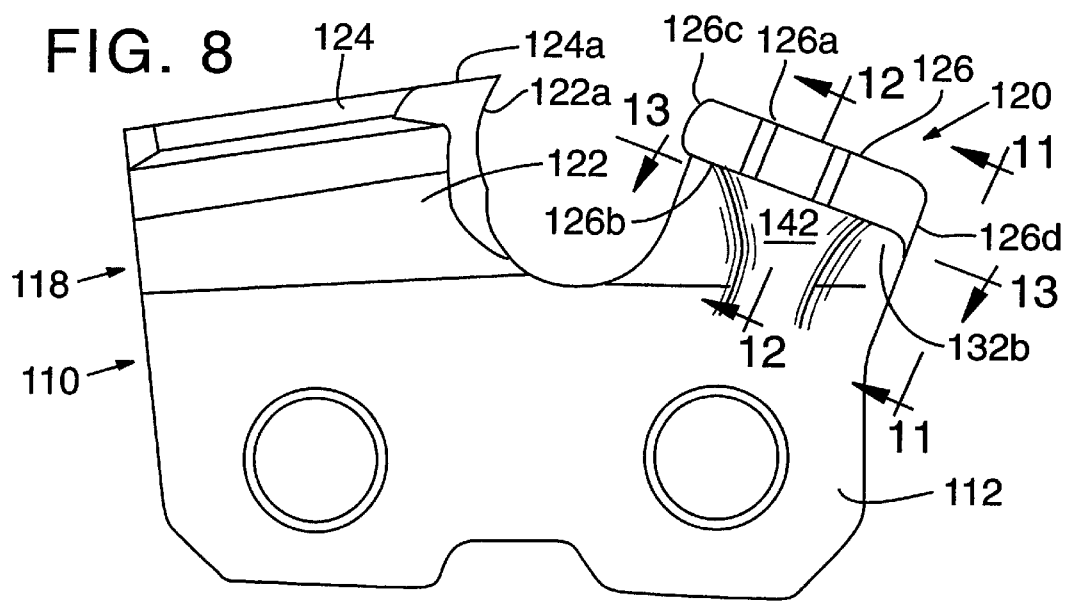
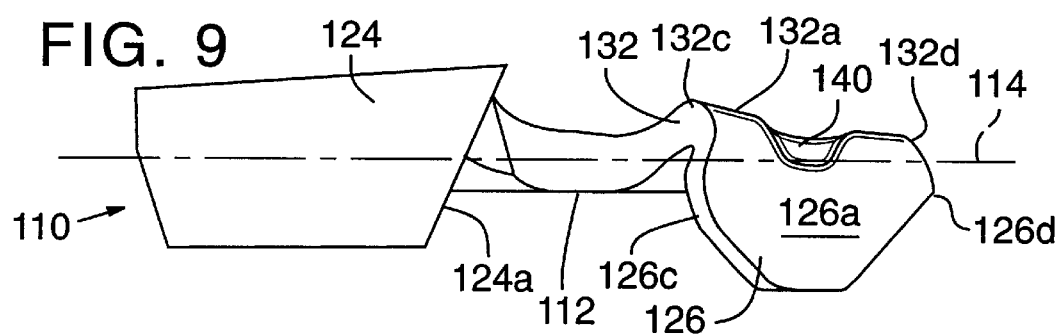
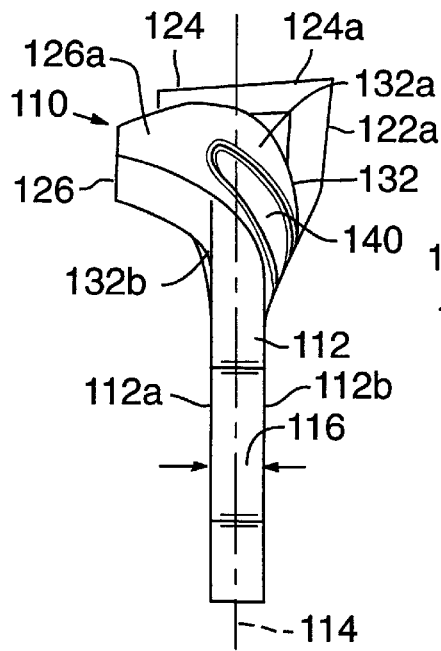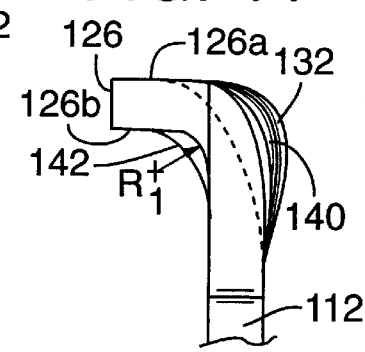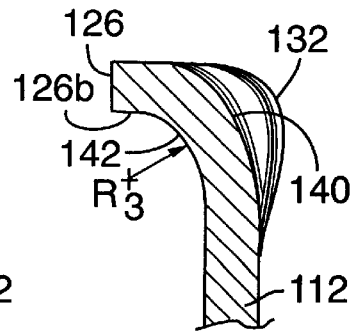

DEPTH GAUGE FOR A CUTTER

CROSS-REFERENCE TO RELATED APPLICATION

This application is a continuation-in-part of application Ser. No. 08/338,344 filed Nov. 14, 1994, now U.S. Pat. No. 5,666,871, which is incorporated herein by reference.

BACKGROUND AND SUMMARY OF THE INVENTION

The present invention relates to an improved depth gauge for a cutter device.

Cutters for endless cutter devices movable along a path for cutting a kerf in a work piece, such as may be found in a saw chain for cutting wood, generally have a cutter portion with a leading cutting edge and a depth gauge portion spaced forwardly of the cutting edge to control the depth of cut taken by the cutter. The depth gauge is instrumental in producing efficient cutting and reducing the possibility of kickback during operation of the saw on which the chain runs.

Depth gauges in the past generally have included a single thickness of cutter material which extends upwardly in a region spaced forwardly from the cutter edge as disclosed in Silvon U.S. Pat. No. 4,353,277. Others have included bent over depth gauge portions such as disclosed in U.S. Pat. Nos. 5,085,113 and 4,989,489 to Pinney, U.S. Pat. No. 4,911,050 to Nitschmann and U.S. Pat. No. 4,841,825 to Martin.

The single thickness upright depth gauge as illustrated in U.S. Pat. No. 4,353,277 may have a tendency to dig into the work piece and not provide consistent cutting depth control. Further it is less stable than a bent over depth gauge. The bent over depth gauges illustrated in U.S. Pat. Nos. 4,911,050; 4,989,489; and 5,085,113 generally have substantially rectangular configurations as viewed in plan, and are susceptible to breakage.

An object of the present invention is to provide a novel depth gauge leading a cutter edge which overcomes the disadvantages of prior devices.

It has been found that prior cantilevered bent over depth gauges may be subject to failure in the region of the bend line, or juncture section, joining the cantilevered depth gauge plate to the body portion of the cutter. Failure often will begin as cracks on the inner side of the bend at the opposed front and rear free ends of the bend. These cracks then migrate inwardly toward the central region of the bend in the depth gauge, producing failure.

It has been discovered that two design modifications may be made to minimize, or eliminate, this problem. First is by producing a larger radius juncture section joining the body portion and depth gauge plate portion. Second, it has been found that benefits arise by deforming the depth gauge material in the bend, or juncture region, inwardly toward the center of bending in a region intermediate the forward and rearward ends of the depth gauge.

The deformation may be in the form of an indentation in the laterally outwardly facing side surface of the juncture section which deforms material inwardly on the underside of the cantilevered depth gauge plate portion. This shifts the neutral axis of the juncture section inwardly toward the center of bonding, such that the stresses will be significantly reduced at the inner sides of the bend at opposed free ends of the bend to eliminate or minimize previously-experienced failure.

An added benefit and advantage occurs from providing an indented deformation on the laterally outwardly facing side of the juncture section. Added side plate relief is provided on the depth gauge forwardly of its rearwardmost edge to reduce drag and friction in the kerf cut, thus to provide more effective and efficient action for the depth gauge.

BRIEF DESCRIPTION OF THE DRAWINGS

FIG. 2 is an enlarged side elevation view of a cutter link removed from the chain of FIG. 1;

FIG. 3 is a top plan view of the cutter of FIG. 2;

FIG. 4 is an enlarged front elevation view of the cutter taken along the line 4—4 in FIG. 1 as it would be attached to other links in the chain;

FIG. 5 is an enlarged side elevation view of a second embodiment of a cutter link removed from a chain as shown in FIG. 1;

FIG. 6 is a top plan view of the cutter of FIG. 5;

FIG. 7 is an enlarged front elevation view of the cutter of FIG. 5 taken along a line similar to the line 4—4 shown in FIG. 1 illustrating the cutter as it would be attached to other links in the chain;

FIG. 8 is a side elevation view of another embodiment of a cutter link removed from a chain as shown in FIG. 1;

FIGS. 9 and 10 are top plan and front elevation views, respectively, of the cutter shown in FIG. 8;

FIG. 11 is an enlarged view taken generally along the line 11—11 in FIG. 8;

FIG. 12 is an enlarged cross sectional view taken generally along the line 12—12 in FIG. 8;

DESCRIPTION OF A PREFERRED EMBODIMENT

Figure 1:
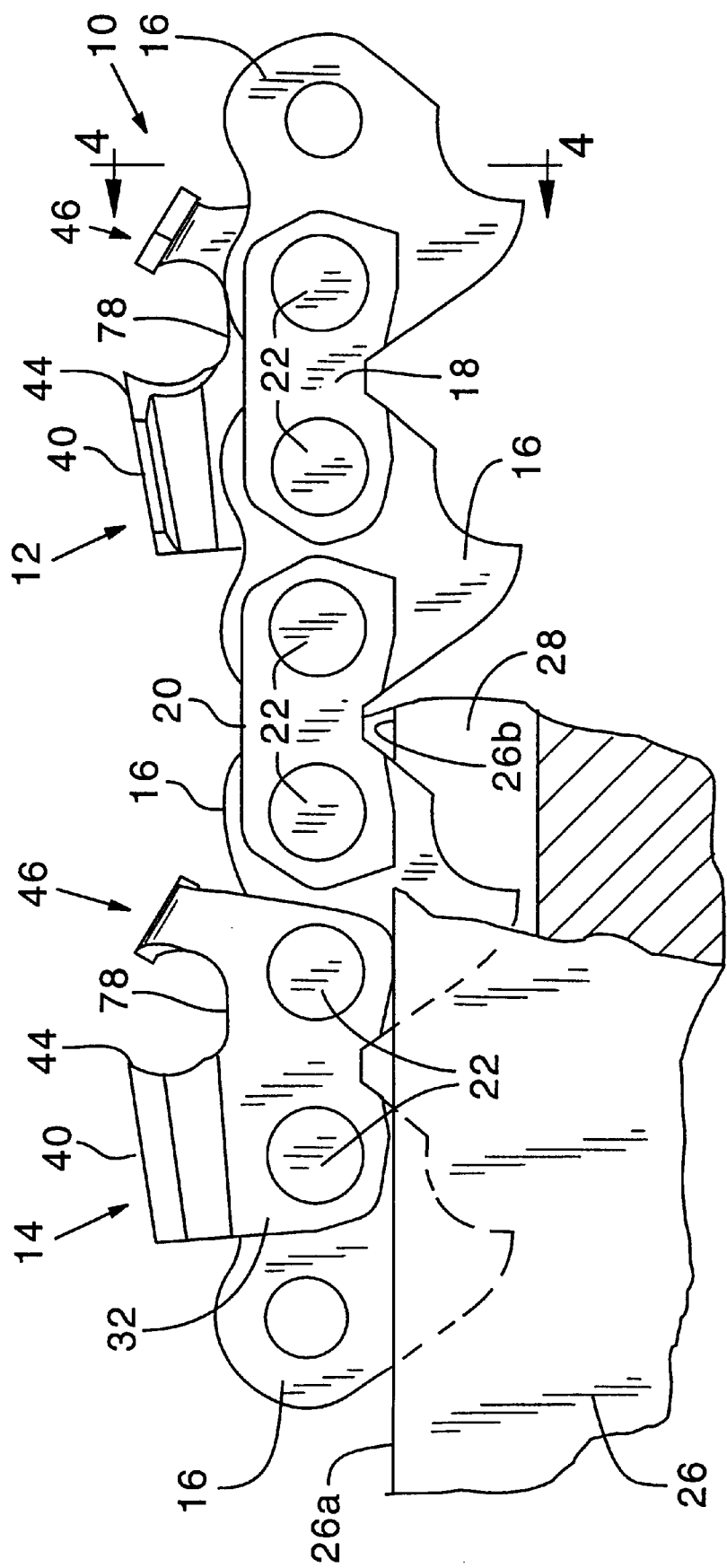
FIG. 1 is a side elevation view of a section of a saw chain incorporating cutters according to an embodiment of the invention.

Referring to the drawings, and first more particularly to FIG. 1, at 10 is indicated generally a section of a cutter chain for use with a chain saw. The chain includes left and right hand cutter links 12, 14, center drive links 16 and connector links 18, 20. All of these links have bores extending therethrough adjacent opposite ends. Rivets 22, acting as pivot pins, extend through aligned bores in the links to pivotally interconnect the cutter, drive, and connector links together.

The chain is supported for travel on a guide bar, a portion of which is indicated at 26 having a groove 28 in which depending tang portions of drive links 16 slidably move. The undersides of the cutter links and connector links ride slidably along supporting guide rails 26a, 26b at opposite sides of groove 28.

Referring to FIGS. 2, 3 and 4, a left-hand cutter link 12 is illustrated in enlarged form to illustrate an embodiment of the present invention. The cutter, or cutter link, 12 includes a substantially planar upright body portion 32 having a center plane noted generally at 33. A pair of spaced apart rivet receiving bores 34, 36 extend through the rear, or heel, region 32a and the front, or toe, region 32b, respectively, of body 32. The centers of bores 34, 36 are aligned on a center line 39 which is generally parallel to the guide rails 26a, 26b on which the chain runs.

As is best seen in FIG. 2 the underside 41 of the cutter body under bore 36 in the toe region adjacent the front of the cutter is spaced a selected distance 41a beneath the center of bore 36. The underside 43 of the cutter body under the center of bore 34 is clipped so that it angles upwardly on progressing to the rear at an angle of 1½° to 5° relative to centerline 39. The distance 43a to the underside of portion 43 from the center of bore 34 is less than distance 41a, preferably in a range of 0.01 to 0.08 inch. This distance will vary in relation to the size and style of cutter.

The rear end region 32a of the body has a cutter portion 40 thereon. The cutter portion includes a cutter top plate portion 42 and a forwardly facing cutting edge 44. The cutter top plate portion is bent over at substantially a right angle relative to and overlies body portion 32 of the cutter. The cutting edge 44 extends transversely of the plane of the body portion and overlies the body portion.

The cutting edge 44 is spaced a selected elevation above the body portion for cutting purposes. The free outer end of the cutting edge 44 is spaced a distance 45 from the center plane 33 of the body portion.

A depth gauge portion 46 is mounted on the front end region 32b of the body portion. The depth gauge portion includes a plate portion 48 which is bent over at a substantial angle relative to the plane of the body portion and has a substantially planar upper surface 48a which is inclined continuously downwardly on progressing forwardly in the cutter. The depth gauge portion in the illustrated cutter is bent over at substantially a right angle relative to the plane of the body portion and overlies the body portion.

As is best seen in FIG. 4 a juncture section 52 disposed at a slight angle relative to the plane of body portion 32 interconnects the body portion and depth gauge portion and the depth gauge is cantilevered outwardly therefrom with a free outer edge.

Referring to FIG. 3, it will be seen that the depth gauge plate portion 48 is multi-angular, and in this embodiment is substantially pentagonal. The rearwardly facing rear edge of the plate portion 48 has a central portion 56 nearest cutting edge 44. The rear edge has opposed side portions 58, 60 which in the illustrated embodiment extend forwardly from central portion 56 and diverge from each other on progressing forwardly from the central portion. As is seen in FIG. 3, the central portion 56 is formed by the juncture of side portions 58, 60, is substantially a convex curve, and has a width which is a minor portion of the overall width of the depth gauge. The side portion 58 could extend perpendicular to center plane 33 from central portion 56, if desired, with side portion 60 alone extending forwardly and downwardly from the central portion. However, it is believed that operational benefits occur by having both sides 58, 60 angled forwardly from the central portion.

Referring to FIGS. 3 and 4, cutting edge 44 has a defined width 47 extending laterally, or transversely, of the cutter, and central portion 56 of the rear edge of the depth gauge is disposed intermediate, and here substantially centrally of, opposite ends of the cutting edge.

As side portions 58, 60 extend forwardly from central portion 56, not only do they diverge from each other but they also slope downwardly from central portion 56. Thus, central portion 56 is disposed at the greatest elevation relative to the body portion and nearest the elevation of cutter edge 44. The central portion 56 of the rear edge of the depth gauge is aligned forwardly of an intermediate region of the cutting edge 44.

Extending forwardly from rear edge side portions 58, 60 are opposed side edges 64, 66. These side edges converge toward each other as they progress forwardly from their junctures with side portions 58, 60. They join with opposite ends of front edge 68 which extends substantially laterally of the plane of the body portion.

The juncture between rear edge side portion 60 and side edge 66 is formed in a convexly curved outer edge 70 which is at the region of maximum width for the depth gauge. Since the depth gauge plate portion 48 is joined only along side edge 64 to juncture portion 52, it has a free side region extending away from the body portion which includes rear edge side portion 60 and side edge 66 which converge in the convex curve at central region 70. As is best seen in FIGS. 3 and 4, the maximum width portion 70 of the depth gauge is disposed at an elevation intermediate the highest and lowest portions of the depth gauge, between the front and rear edges of the depth gauge. As seen in FIGS. 3 and 4 in the embodiment illustrated the maximum width 71 of the depth gauge portion (as measured along a line normal to plane 33) is at least as great or greater than the width 47 of the cutter portion 40 following it. Further, the outer edge 70 of the depth gauge projects a distance 73 laterally of central plane 33 which is greater than the distance 45 for cutter edge 44.

Referring to FIG. 4, a right-hand cutter 14 is illustrated which follows cutter 12 in the chain as shown in FIG. 1. A major portion of the top plate of the cutter 14 and its depth gauge are broken away so that they do not interfere with illustration of the major portions of cutter 12. However, it will be seen that central region 70 of depth gauge 46 in the embodiment of cutter 12 illustrated extends outwardly beyond the width of top plate 44 toward the side of the kerf which would be cut by the side cutting edge of cutter 14. Such extension of the depth gauge toward the opposite side of the chain has been found to improve chain stability during cutting.

In FIG. 2 distance 74 denotes the elevational distance that the uppermost portion of depth gauge 46 is spaced below the uppermost edge of cutting edge 44.

This is known generally as the depth gauge setting for the cutter.

Referring still to FIG. 2, depth gauge 46 is spaced a distance forwardly of cutter portion 40 to provide an open gullet space 78 therebetween.

Various angular relationships between the sides, or edges, of the depth gauge are illustrated in FIG. 3. A line 82 is drawn extending normal to the central plane of the cutter body. Angles 84 and 86 denote the orientations of rear edge side portions 58, 60, respectively, relative to line 82. An included angle 88 is defined between rear edge side portions 58, 60. Another line 90 is drawn extending normal to the central plane of the cutter adjacent the forward end of the depth gauge. Angles 94, 96 denote the orientations of side edge 66 and front edge 68, relative to line 90.

An exemplary cutter will now be described having a pitch distance between the center of bores 34, 36 of approximately 0.390 inch, and an overall height of approximately 0.520 inch, depth gauge setting distance 74 may be in a range of 0.015 to 0.030 inch. The following sizes, angles and distances are measured along a horizontal plane, indicated generally at 91 in FIG. 2, and as viewed in plan in FIG. 3. Depth gauge portion 46 may have an overall length of approximately 0.175–0.30 inch. Outer edge 70 of the depth gauge would be in a range of 0.050 to 0.150 inch forwardly of rear edge central portion 56. Angle 84 may be in a range of 0° to 30° (preferably 10° to 30°), angle 86 in a range of 10° to 60°, and included angle 88 in a range of 100°–170°, and preferably 110° to 160°. Angle 94 is in a range of 10°–55° and angle 96 in a range of 0° to 15°. The downward slope 98 of the upper planar surface 48a as shown in FIG. 2 is in a range of 15° to 35°.

Referring to FIG. 4, a dashed line 100 illustrates generally the outline of substantially rectangular depth gauges of prior art devices. Such have not permitted free flow of cut chips to pass easily into the gullet region and under the top plate 42 of the cutter. This inability to free the kerf of debris has resulted in vibration, excessive friction, and other impediments to efficient cutting.

The configuration of the present invention with a depth gauge portion which has angularly disposed sides 58, 60 and a central region 56 at its greatest elevation intermediate the width of the cutter edge permits free flow of chips past the depth gauge rear edge side portions so that debris flows freely into the gullet region and under the cutter top plate toward the chassis of the chain. This free flow of chips is further enhanced by the positioning of the side edges and front edge. Further, friction is minimized by minimizing the amount of the depth gauge which engages the kerf and debris within the kerf.

It will be seen that central portion 56 is the highest and rearwardmost portion of the depth gauge and that remainder portions of the depth gauge incline downwardly and forwardly therefrom.

Although the bent over depth gauge is described here on a cutter with a clipped heel, it should be recognized that the depth gauge configuration can be used in cutters without a clipped heel. The depth gauge of the present invention provides many operational benefits independently of, as well as in conjunction with, a clipped heel configuration.

FIGS. 5–7 illustrate another embodiment of the invention. A cutter 12a is illustrated having a cutter portion 40a with a forwardly facing cutting edge 44a.

A depth gauge portion 46a is mounted on the front end of the body portion of the cutter and is bent over at a substantial angle relative to the plane of the body portion. It has a substantially planar upper surface 48b which is inclined downwardly on progressing forwardly in the cutter.

The depth gauge portion 46a illustrated in FIGS. 5–7 is multi-angular, and in this embodiment is substantially hexagonal.

The configuration of the depth gauge 46a is somewhat similar to that previously described for depth gauge 46, except that in this configuration, rather than having a convexly curved outer edge region 70 between edges 60 and 66, there is a substantially flat side 70a provided between side edges 60a, 66a.

In operation of a saw chain having a cutter constructed as illustrated, as the saw chain is driven forwardly the depth of cut is controlled by depth gauge portion 46 leading cutting edge 44. The depth gauge portion having the configuration illustrated provides effective depth gauge control, chain stability and kickback minimization while permitting chips produced in the kerf of the work piece to flow freely past the depth gauge and into the chassis region of the chain underlying the bent over cutter portion 42 of the cutter.

Further, with the clipped heel portion of the cutter, and a connector link on the opposite side with a clipped heel portion paralleling the clipped heel of the cutter as illustrated for link 18 in FIG. 1, such is able to rock rearwardly in the articulated chain to reduce vibration. When this occurs the effective depth gauge setting 74 is reduced to reduce vibration in the chain. The configuration of the bent over depth gauge acts in conjunction with the clipped heel portion to provide lateral stability in the chain should such rocking occur. Explaining further, previous cutting chains which may have had clipped heel portions have included a generally planar upright depth gauge which produced very narrow contact with the work piece. This could allow rotation of chain parts about the central axis extending longitudinally of the chain. With the present depth gauge configuration, having a width which is major portion of or greater than the width of the cutter, the depth gauge will engage the kerf to provide greater stability, and reduce the tendency of the chain parts to rotate about the central axis of the chain.

The bent over depth gauge design of the present invention provides sufficient width to produce kickback control for safety, while still producing improved chip flow.

Another embodiment of the invention is illustrated in FIGS. 8–14. Here a cutter device, or cutter link, 110 is shown having a main body section, or body portion, 112. The body portion 112 is substantially planar having opposed face surfaces 112a, 112b and is shown with a substantially upright central plane 114. The cutter is formed as a monolithic, or integral, whole from plate metal stock having selected thickness as indicated generally at 116 between its opposed face surfaces. It has a cutter portion 118 extending upwardly from the rear portion of body portion 112 and a depth gauge portion, or depth gauge, 120 projecting upwardly from a forward region of the body.

The cutter portion has an upright side plate portion 122 with an upright leading sharpened cutting edge 122a. Cantilevered from side plate portion 122 and extending transversely of plane 114 is cutter top plate 124 having a leading top plate cutting edge 124a which extends transversely of plane 114.

The depth gauge has a bent over depth gauge plate portion 126 which is cantilevered above the body portion and extends at a substantial angle relative to and transversely of plane 114. The depth gauge plate portion illustrated is disposed substantially at a right angle relative to plane 114.

As is best seen in FIG. 8 depth gauge portion 126 has opposed, substantially parallel upper and lower surfaces 126a, 126b. The top surface 126a is substantially planar and inclines substantially continuously downwardly from the rearward edge 126c toward the forward edge 126d of the depth plate portion.

The depth gauge plate portion is interconnected to the body portion by a juncture section 132. The juncture section 132 has an outer face surface at 132a and an inner face surface 132b. These outer and inner face surfaces 132a, 132b, respectively merge with top surface 126a and bottom surface 126b of the depth gauge portion.

The juncture section may be formed in a larger radius bend, or curve, then previous bent over depth gauges to strengthen the part and minimize breakage. Inner radius R1 (FIG. 11) may be in a range of 0.5 to 2.0 times thickness 116.

Figure 13:
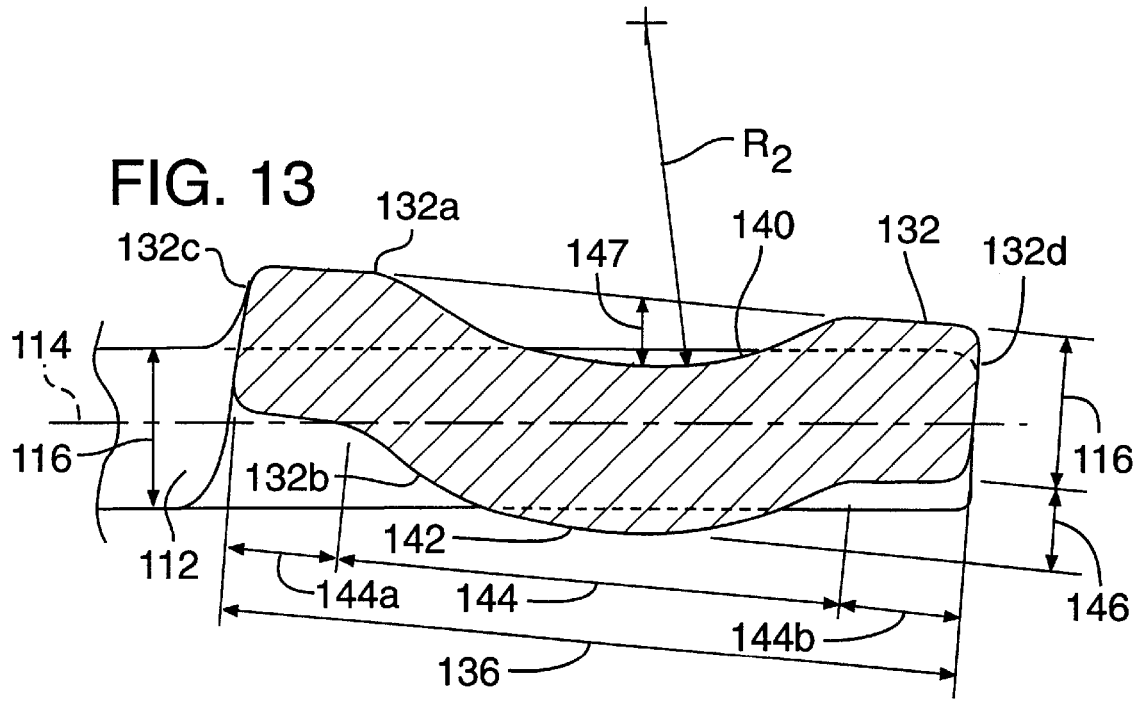
FIG. 13 is an enlarged cross sectional view taken generally along the line 13—13 in FIG. 8.

Referring to FIGS. 9 and 13, the juncture section has rear and front ends denoted generally at 132c, 132d. The length of the juncture section between its opposite ends 132c, 132d is denoted by dimension line 136. This generally will be several times the thickness 116 of the part.

As viewed from above in FIGS. 9 and 13, a portion of the juncture section intermediate its ends is deformed, or indented, laterally inwardly toward the center of bending and toward plane 114 from remainder portions of the juncture section. This deformed region, or section, intermediate ends 132c, 132d is indicated generally at 140. Section 140 produces a concave outer curvature section whereby the portion of outer surface 132a adjacent rear edge 132c is the region of the depth gauge portion farthest to one side of plane 114, with remainder portions of the juncture section forwardly thereof spaced inwardly toward central plane 114 therefrom to provide added side plate relief for the depth gauge to minimize frictional engagement with the side edge of the kerf cut by the cutter.

The deformed region or section has, at its approximate fore-to-aft central region, an inner radius of curvature R3 (see FIG. 12) which is greater than R1.

Referring to FIGS. 10–13, the deformed region 140 of the juncture section projects laterally from the inner face of body portion 112 and connects to, or joins integrally with, the underside 126b of the depth gauge. This inwardly projecting portion of the deformed region of the juncture section 140 produces a supporting portion 142 which underlies and provides support for the cantilevered depth gauge portion.

As is seen in FIG. 13, the deformed portion 140 has a length denoted 144 and projects inwardly from remainder portions of the inner surface of juncture section a distance indicated generally at 146. This is generally the same distance by which the juncture section is indented from the other side as indicated at 147. As is seen in FIG. 13, the outwardly facing surface of the juncture section is generally concavely curved, whereas its inner side is convexly curved. Although a variety of different deformed cross sections may be used (i.e. angular, multi-angular, various curve forms, etc.) it has been found preferable to place the deformation substantially centrally between the front and rear edges of the juncture section and to make the deformation substantially curvilinear throughout to minimize regions of stress concentration.

The manufacture of the cutter with the depth gauge as shown in FIGS. 8–13 is somewhat similar to that previously described. For example, metal plate stock is cut to a defined outer configuration and then deformed to produce the bent over hooded cutter portion. Also the depth gauge of the form illustrated is bent over in the forming process. During this forming process, an indentation 140 is impressed on the outside of the juncture section to a depth indicated generally at 147 to form the underlying deformation 142 projecting inwardly and supporting the depth gauge top plate.

In the forming process, the general curvature of the bent over juncture section adjacent its front and rear ends is as indicated at R1 in FIG. 11 (inner radius of juncture section) and may be approximately equal to the thickness 116 of the plate material. R1 preferably may be in a range of from 0.5 to 2.0 times thickness 116.

Referring to FIG. 13, as seen from above indentation 140 is formed at its maximum indentation adjacent the depth gauge plate portion 126 with a radius R2 generally equal to or greater than the thickness 116 of the part. The indentation distance 147 preferably may be in a range of about 0.1 to 1.0 times thickness 116, and more preferably about 0.30–0.40. This may vary in relation to the form of deformation chosen for a specific part. The length of juncture section 132 has been previously denoted by dimension line 136. The general length of the deformed portion on the inner side of the depth plate gauge is noted at 144. This is deformed inwardly from remainder portions of the juncture section in a convex curve a distance denoted generally at 146. This is similar to the depth of the concave curve on the other side denoted by 147. Thus, the deformed portion may extend laterally of remainder portions of the juncture section in a range of from 0.1 to 1.0 times thickness 116.

The length of the deformation as measured by dimension line 144 may be of variable length, but has been found to work well in a range of 0.25 to 0.67 times length 136. Dependent on length 136, length 144 may be in a range of from 1 to 5 times thickness 116. As seen in FIG. 13 the deformed section preferably is spaced longitudinally of the part from the front and rear ends 132c, 132d, by distances noted 144a, and 144b. Distances 144a, 144b each preferably are at least 0.1 times thickness 116.

As seen in FIG. 12 an inner radius R3 is denoted for the inner side of deformed portion 140. R3 is greater than R1 and preferably may be in a range of from 1 to 4 times thickness 116.

An exemplary depth gauge juncture section which has been tested and shown to work well, has a material thickness of 0.050 inch, an inner radius R1 for the bent over juncture section of approximately 0.050 inch, deformation dimensions 146 and 147 of approximately 0.015 inch, a length 136 of approximately 0.230 inch and a length 144 of approximately 0.080 inch.

As is seen in the illustrations, attempts are made to maintain substantially curvilinear configuration for the deformation throughout to minimize stress regions.

The depth gauge just described in regard to the embodiment illustrated in FIGS. 8–13 operates substantially as those in embodiments previously described herein. However, it has been found that the embodiment illustrated in FIGS. 8–13 has greater resistance to breakage.

During operation a variety of loads are imposed on the depth gauge portion. Due to such loading it has been found in prior bent over depth gauges (without a deformed support section as provided here) that failure occurs with cracks initiating at the front and rear corners of the inside surface of the bent over portion where the depth gauge top plate joins with the body portion or juncture section. The present design, with a larger radius juncture section and engineered, or deformed, cross section is designed to displace the region of highest stress inwardly from the free front and rear end corners to reduce failure due to breakage.

First, by increasing the radius of curvature of the juncture section, stress points are reduced during operation from those found in prior devices.

Secondly, the engineered or deformed juncture section is designed to provide added support for the depth gauge and to move the regions of highest stress away from the free edges, or ends, of the bend section. This minimizes, or dramatically reduces, the stresses that previously produced cracking and failure at the free ends, or edges, of the bend section in prior devices.

Figure 14:
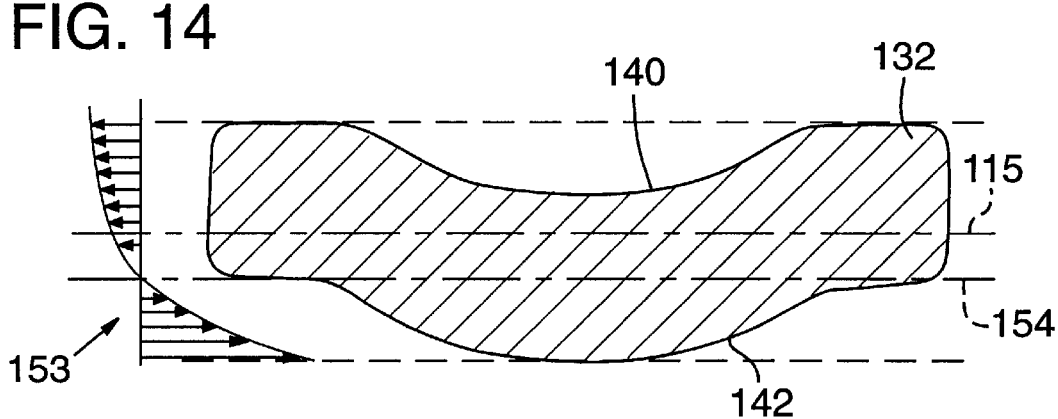
FIG. 14 is a view of the cross sectioned portion only of FIG. 13.
Figure 15:
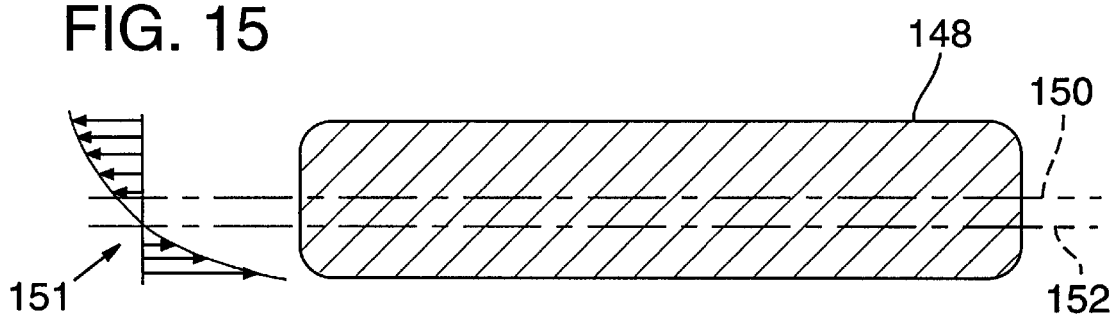
FIG. 15 is a view somewhat similar to that of FIG. 14, but illustrating a substantially planar side plate, or juncture, portion as could have been used in previously-known bent over depth gauge members.

One reason for the success of this structure possibly can be described by comparing the cross sections illustrated in FIGS. 14 and 15. FIG. 14 is an example of the cross section of a deformed juncture section according to an embodiment of the present invention. FIG. 15, on the other hand, is a cross section taken at a similar point for a bent over depth gauge construction 148 without the deformed, or engineered, cross section.

Figure 16:
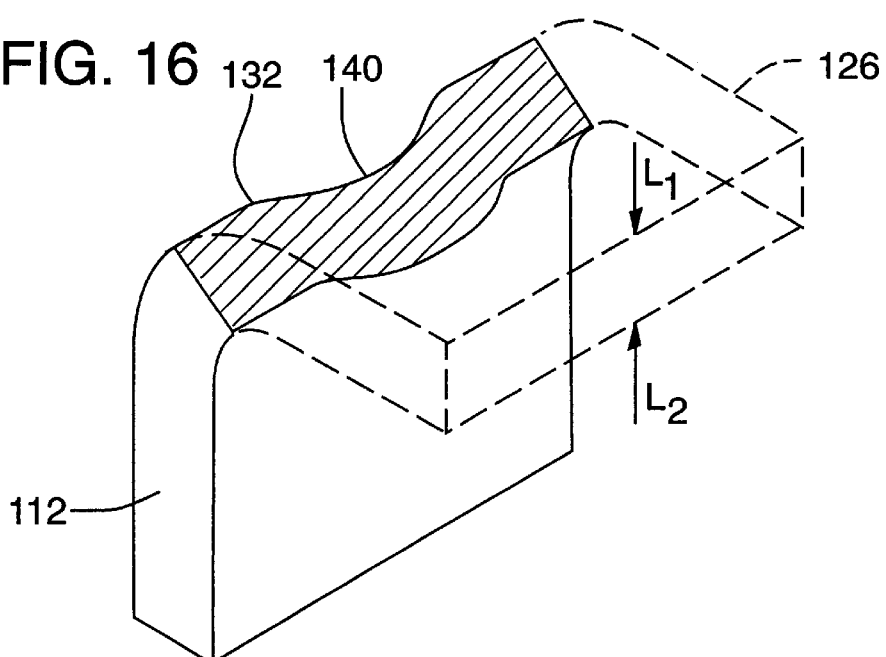
FIG. 16 is a simplified view of a bent over section in a form according to the present invention where an element similar to FIG. 14 would be found.
Figure 17:
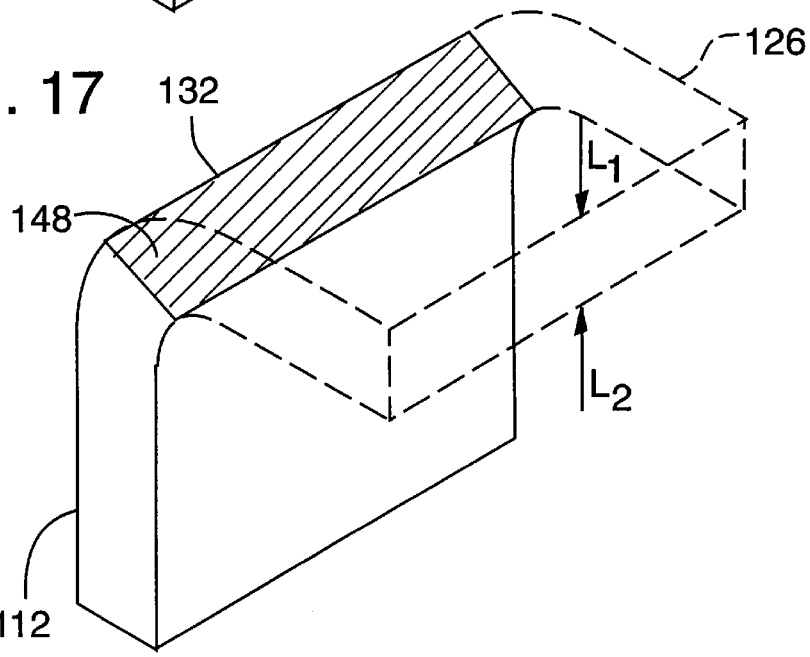
FIG. 17 is a simplified view of a bent over section in which an element such as shown in FIG. 15 might be found.

FIGS. 16 and 17 are simplified illustrations at the regions at which sections 14 and 15 respectively are taken in structures as described. Each is in the form of a curved beam having a base plate portion 112, a cantilevered top plate 126 and a juncture section 132. The sections illustrated in FIGS. 14 and 15 are highlighted in cross section in FIGS. 16 and 17, respectively.

It is important to note that these are what are referred to as "curved beams" in engineering terms and they have somewhat different characteristics when placed under load than do straight beams.

In operation of a saw chain using a cutter with a bent over depth gauge as illustrated, it is believed that loads directed as illustrated at L1 and L2 in FIGS. 16 and 17 are imposed on the depth gauge top plate. Load L produces a compressive, or downwardly, directed force. Load, or force, L2 occurs in the opposite direction. Force L2 imposed on the cantilevered depth gauge top plate is the force which induced failure by cracking which began at the front and rear ends of the underside of the bent over juncture section in previous bent over depth gauges and then migrated from the front and rear ends toward the middle of the juncture section.

The centroid, or centroidal axis, of the structure of FIG. 14 is indicated at 115. The centroid, or centroidal axis, for the part in FIG. 15 is indicated generally at 150.

The two sections will be discussed as being cross sections of curved beams, with the distribution of stresses over their cross sections under bending loads produced by forces applied to the depth gauge attached thereto such as L1 and L2.

If the sections illustrated in FIGS. 14 and 15 were portions of straight beams their neutral axes would be considered generally to coincide with their centroid, or centroidal axis. However, in computation of characteristics of curved beams the neutral axis shifts inwardly toward the center of curvature by a distance which relates to the severity, or degree, of curvature of the beam.

In FIG. 15, the neutral axis of the section is indicated generally at 152 offset toward the center of curvature from centroid 150. With a load applied to top plate 126 as indicated at L1 or L2 in FIG. 17, the stress concentration in the section will be distributed generally as indicated at 151 at the left-hand region of FIG. 15. As seen, the region of zero stress is at neutral axis 152. The material on one side of the neutral axis generally will be under tension and the other side is under compression due to forces imposed on the cantilevered depth gauge. On either side the stress will be highest at the face of the part and declines to zero at the neutral axis, but the greatest stress will be at the surface of the inside, concave bend radius. In practice, especially in die cut parts where micro-cracks at sheared edges present stress concentrations, corners may be the source of initiation of fatigue cracks which then may migrate inwardly.

Referring to FIG. 14, the deformation of the central portion of the juncture section causes the neutral axis 154 to shift in the direction of the center of curvature and may be so shifted that the neutral axis 154 lies generally along the face of the non-deformed regions of the juncture section at opposite ends of sections 140, 142.

With this structure, the stress induced in the part by loading of the bent over depth gauge is indicated at 153 at the left side of FIG. 14. As with the stress diagram in FIG. 15 the maximum stress is seen to occur at the extreme outer faces of the part. However, here the neutral axis 154 has been shifted generally to the inner faces of the forward and rearward ends of the juncture section directed toward the center of curvature for the juncture section, and thus there is virtually no stress in either a compressive or tensile mode at the inner faces of the front and rear end, or edge, regions. Since the maximum stress is shifted to the central deformed region, where no micro-cracks or sheared edge conditions exist, more loading, or work, is necessary to cause cracks to initiate in this central region than at the corners. Thus the reliability and resistance to breakage for the part is notably improved.

Certain texts on curved beam calculations note that it is important to distinguish between whether the element involved is a thick member or a thin member. Certain texts have noted that when the mean radius of curvature is about ten times the thickness, or depth, of the cross section the member is considered thin and it is generally not critical to factor in curved beam theories. Some even have gone down to six times the depth or thickness without finding undue error in calculations. However, if the radius of curvature is less than six times the depth or thickness of the material, curved beam theories of calculations must be factored into account and such produce movement of the neutral axis as described above.

The radius of curvature as noted for applicants' invention as set out herein establishes that it is in what might be considered a tight radius curve when dealing with curved beam calculations. Since it is a tight radius curve the stresses on the inside of the curve normally might be increased to two to three times higher than normal due to curved beam calculations. However, by providing the engineered, or deformed, section for the part in the manner described to move the neutral axis toward, or to, the inside edges of the front and rear ends of the juncture section, the effect of the stress multiplier feature is reduced, or eliminated, at these points.

Figure 18:
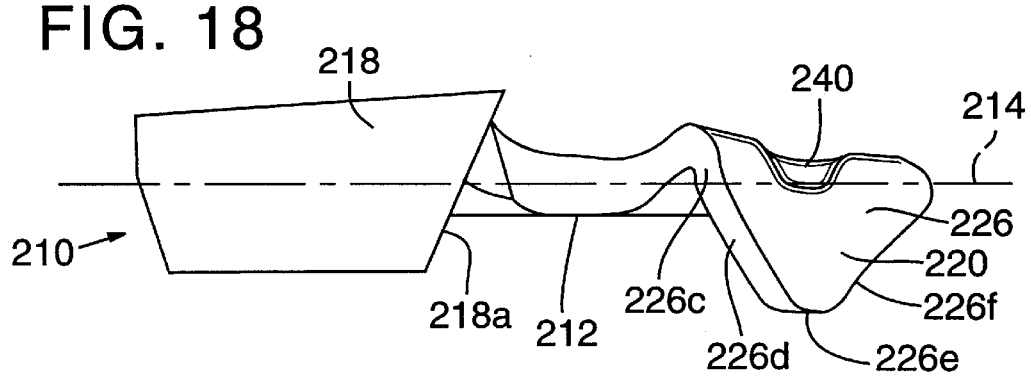
FIG. 18 is a top plan view of another embodiment of the invention.

FIG. 18 illustrates another embodiment of the subject invention. At 210 is noted a cutter link somewhat similar to that previously described in regard to FIG. 9, having a main body section, or portion, 212. The body portion 212 is substantially planar and is shown with a substantially upright central plane 214. The cutter is formed as a monolithic, or integral, whole from plate metal stock having selected thickness throughout. It has a cutter portion 218 extending upwardly from the rear portion of the body portion 212 and a depth gauge portion, or depth gauge, 220 projecting upwardly from a forward region of the body.

The depth gauge has a depth gauge plate portion 226 bent over in a cantilevered position above the body portion and extending at a substantial angle relative to and transversely of plane 214. The orientation of depth gauge plate portion 226 is substantially similar to that illustrated in FIGS. 8–12 for a prior embodiment. It has a deformed side portion 240 performing the same function as that set out above in regard to the embodiment described in regard to 110.

In this embodiment shown in FIG. 18 the rearwardmost portion 226c of the depth gauge portion is on the same side of central axis 214 as cutting corner 218a of the rearwardly-mounted cutter portion 218. Its rearwardmost edge 226d slopes forwardly and downwardly from rearwardmost region 226c to a side portion 226e. A forward region of the depth gauge 226f is more scalloped in configuration than previously-described embodiments and reduces the amount of material existing in the depth gauge plate.

It has been found that the configuration of the depth gauge plate as illustrated in FIG. 18 maintains adequate kick-back protection while improving cutting capabilities of the cutter. In essence, it merely omits some of the material found in other links described herein.

Figure 19:
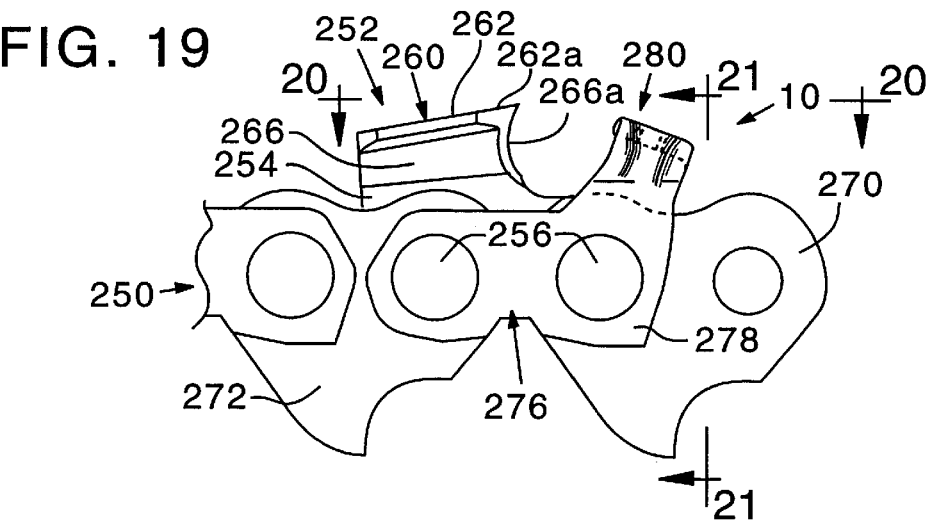
FIG. 19 is a side elevation view of a section of a saw chain incorporating a cutter link without a leading depth gauge formed thereon and having an opposed side link parallel to the cutter link with a depth gauge portion according to an embodiment of the invention which extends laterally of the chain in front of the cutter edge.
Figure 20:
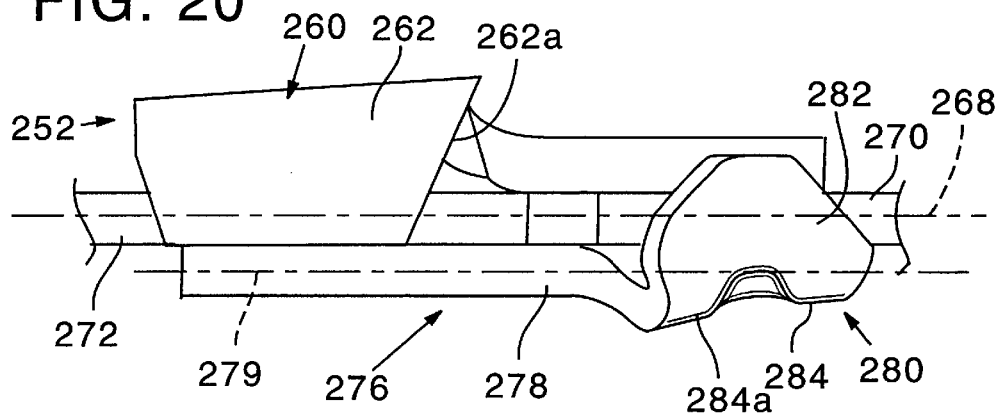
FIG. 20 is an enlarged top plan view taken along the line 20—20 in FIG. 19.
Figure 21:
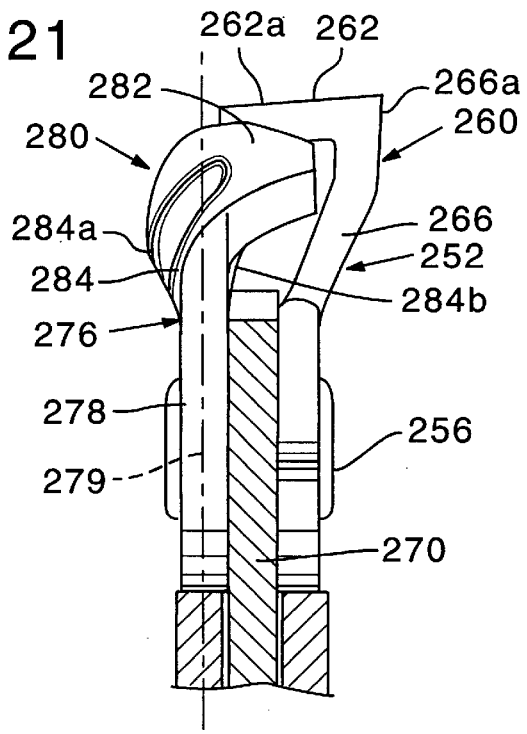
FIG. 21 is an enlarged front view taken along the line 21—21 in FIG. 19.

Referring to FIGS. 19–21, another embodiment of the invention is illustrated. Here, a cutting chain 250 has alternate left- and right-hand cutter links, with a left-hand cutter link 252 being illustrated here. The cutter link 252, has a planar upright body portion 254 with a pair of bores extending therethrough to receive rivets 256. The rear-end region of the body has a cutter portion 260 thereon including a top plate 262 with a forwardly-facing top plate cutting edge 262a. A side plate portion 266 joins body portion 254 and top plate 262. The side plate has a forwardly-facing side plate cutting edge 266a, which joins with top plate cutting edge 262a.

The forward portion of cutter 252 does not have an upwardly-projecting depth gauge portion thereon.

Connected to cutter link 252 through rivets 256, and disposed on the longitudinal centerline 268 of the chain are leading and trailing center drive links 270, 272, respectively.

Secured to the sides of center drive links 270, 272 opposite cutter 252 and also pivotally mounted on rivets 256 is a side tie strap 276. The tie strap 276 opposite cutter 252 has a substantially planar body portion 278, with an upright central plane 279. A depth gauge portion 280 extends upwardly from body portion 278 to lead the top plate and side plate cutting edges 262a, 266a.

Depth gauge portion 280 is structured somewhat similarly to depth gauge portion, or depth gauge, 120 previously described in relation to the embodiment illustrated in FIGS. 8–13. However here, rather than extending initially upwardly and outwardly from the body portion 278 in the direction of side plate cutting edge 266a, as in the prior embodiment, it projects outwardly oppositely therefrom as illustrated in FIGS. 20 and 21. It then progresses to a bent over depth gauge plate portion 282 which is cantilevered above the body portion and extends at a substantial angle relative to and transversely of the plane of the body portion and across centerline 268. Generally it will extend substantially normal to the plane of the body portion. Again, the juncture section 284, between the body portion and the depth gauge plate portion has an outer surface 284a and an inner surface 284b which respectively merge with the top and bottom surfaces of the depth gauge portion, respectively.

As viewed in FIGS. 20, 21 a portion of the juncture section intermediate its ends is deformed, or indented, laterally inwardly toward the center of bending and toward the plane of body 278 from remainder portions of the juncture section, as was previously described for the embodiment illustrated in FIGS. 8–12. The top plate portion of the depth gauge may be extended sufficiently to the side of the plane of the body toward side plate cutting edge 266a, that it provides not only depth of cut control for the top plate cutting edge 262a, but also for the side plate cutting edge.

The general structure and function of the depth gauge portion mounted on side link 276 is similar to that previously described in conjunction with the embodiment illustrated in FIGS. 8–12. It has been found that this structure, of placing the leading depth gauge on a side tie strap opposite a cutter link which does not have its own depth gauge, can provide very efficient cutting.

Figure 22:
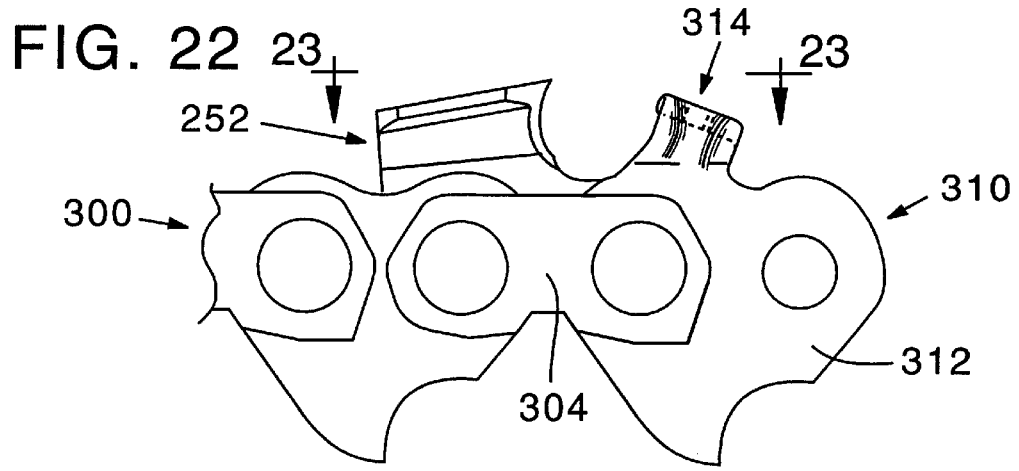
FIG. 22 is a side elevation view of a section of a saw chain incorporating a cutter, again which does not have a leading depth gauge formed thereon, and having a center drive link with a depth gauge according to an embodiment of the invention formed thereon leading the cutter edge.
Figure 23:
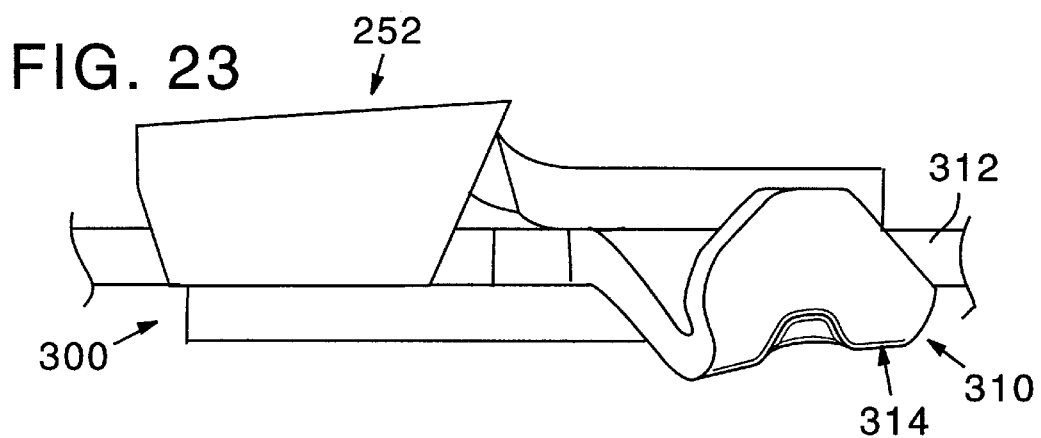
FIG. 23 is an enlarged top view taken generally along the line 23—23 in FIG. 22.

Referring to FIGS. 22 and 23, yet another embodiment of the invention is illustrated wherein a segment of chain 300, again has a cutter link as previously described at 252 lacking a monolithically, or integrally, formed leading depth gauge portion. A plain tie strap 304 is disposed opposite the cutter link. Here, a leading center drive link 310 has a substantially planar upright body portion 312 with a depth gauge portion 314 extending upwardly from the rear end portion thereof. As seen in FIGS. 22 and 23, the structure and general positioning of depth gauge 314 on the center drive link is similar to that described above in relation to depth gauge 280 in the embodiments of FIGS. 19–21. The cantilevered depth gauge plate portion and its associated juncture portion have a deformation as previously described to provide additional strength and resistance to breakage.

Optionally, the depth gauge portions of the embodiments of FIGS. 19–24 could be bent-over in the direction opposite that illustrated, as could the earlier-described and illustrated embodiments. Further, although various depth gauge top plate configurations have been illustrated and described, the features of the present invention may be advantageously incorporated in cutters with different configurations, including, but not limited to square or rectangular.

Figure 24:
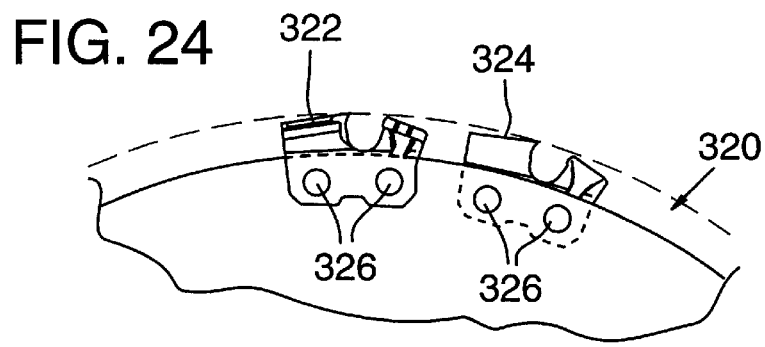
FIG. 24 is a partial side elevation view of a circular saw disk having cutter elements according to an embodiment of the invention secured to its peripheral edge.
Figure 25:
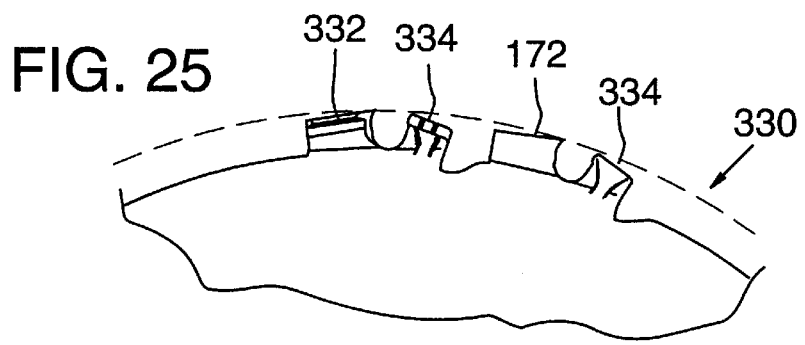
FIG. 25 is a partial side elevation view of a circular saw having cutters formed according to an embodiment of the invention formed in the peripheral edge of the cutter disk.

Additional uses of cutters and depth gauges according to various embodiments of the invention are illustrated in FIGS. 24 and 25. Here, the cutters and depth gauges are not mounted on a cutter chain for a chain saw. Instead, in FIG. 24, a circular saw disk 320, has left-and right-hand cutters 322, 324 secured thereto by rivets 326. These cutters may have any of the configurations illustrated and described herein or as covered by a following claim.

FIG. 25 illustrates that a saw disk 330 may have formed on the periphery thereof (rather than merely being attached thereto) a plurality of cutters 332, which are led by depth gauge portions 334. Again, these may be formed as described in any of the previously discussed embodiments, or any that are covered by the appended claims.

Although the depth gauges, or depth gauge portions, shown herein have a variety of shapes, it should be understood that the deformed side plate, or juncture, portion providing the benefits set out above, may be used with depth gauges having a variety of other shapes. For example, but in no way to limit the scope of the invention, a bent over depth gauge using the improved deformed, or engineered section as described herein may have straight, curved, or multiangular leading and/or trailing edges or a variety of other configurations.

While preferred embodiments of the invention have been disclosed herein, it will be apparent to those skilled in the art that changes and modifications may be made without departing from the spirit of the invention.

What is claimed is:

1. A cutter movable along a path for cutting a kerf in a work piece, said cutter in an upright position comprising
a body portion disposed in a substantially upright plane having opposed inner and outer faces, and forward and rearward regions,
a cutter portion on the rearward region of the body portion having a forwardly facing cutting edge at a selected elevation above the body portion, and
a depth gauge portion on the forward region of the body portion, said depth gauge portion comprising a plate portion joined at a juncture section to said body portion and cantilevered over said inner face above said body portion at a substantial angle relative to the plane of the body portion, said plate portion having an upper surface inclined downwardly from a rear region of the plate portion disposed at an elevation adjacent but below the elevation of the cutting edge toward a forward region of the plate portion which is disposed at a lower elevation, said depth gauge portion and juncture section having front and rear ends, and a portion of said juncture section being deformed laterally intermediate said front and rear ends to produce a concave curve as viewed from above at an outer face of the juncture section and a convex curve at an inner face thereof.

2. The cutter of claim 1, wherein said juncture section has an indentation formed by the concave curve and a projection formed by the convex curve.

3. The cutter of claim 1, wherein said deformed portion of said juncture section provides a support projecting outwardly from said inner face which underlies and is connected to said depth gauge portion.

4. The cutter of claim 1, which is formed from plate stock of a selected thickness, and said depth gauge portion is bent over relative to said body portion with the juncture section having an inner radius in a range of 0.5 to 2.0 times said selected thickness.

5. The cutter of claim 1, which is formed from plate material of a selected thickness and said deformed portion of said juncture section projects outwardly from remainder portions of said inner face a distance at least 0.1 times said thickness.

6. The cutter of claim 1, wherein the cutter is formed from plate stock of selected thickness and the deformation of the juncture section is in a range of 0.1 to 1.0 times the selected thickness.

7. The cutter of claim 5, wherein the deformation has a length measured longitudinally of said cutter which is in a range of from 1.5 to 5.0 times said selected thickness.

8. The cutter of claim 1, wherein said juncture section has a selected juncture length and the deformation has length measured longitudinally of the cutter which is in a range of from 0.25 to 0.75 times said juncture length.

9. The cutter of claim 1, wherein said deformed portion of the juncture section is spaced at least 0.1 times the thickness of the plate material from each end of the juncture section.

10. The cutter of claim 1, wherein said deformation as viewed from above is arcuate, with the maximum deformation occurring substantially centrally between said front and rear ends.

11. The cutter of claim 2, wherein said indentation is formed in a laterally outwardly facing side surface of the juncture section forwardly of the rear edge of the depth gauge portion and provides added side plate relief for the depth gauge portion.

12. The cutter of claim 1, wherein said depth gauge plate portion is disposed substantially normal to the plane of the body portion.

13. The cutter of claim 1, wherein said deformation is substantially curvilinear throughout.

14. A depth gauge for a cutter device moveable along a path for cutting a kerf in a workpiece in an upright position comprising a body portion having a substantially upright central plane, a depth gauge plate portion cantilevered above said body portion extending at a substantial angle relative to said plane, and a juncture section interconnecting said body portion and plate portion, said juncture section having front and rear ends, with a portion of said juncture section being deformed intermediate said front and rear ends to produce an indentation in a laterally facing outer side surface as viewed from above.

15. A depth gauge of claim 14, wherein said deformation produces a projection at a laterally facing inner side surface opposite said indentation.

16. The depth gauge of claim 15, wherein said projection underlies and joins integrally with said depth gauge plate portion to provide a support for said depth gauge plate portion.

17. The depth gauge of claim 16, wherein said indentation is formed in a concave curve and said projection is formed in a convex curve.

18. The depth gauge of claim 14, wherein said juncture section has a forward region and a rearward region and the laterally facing outer surface of said rearward region is spaced laterally outwardly from said plane a distance greater than the laterally facing outer surface of said forward region.

19. The depth gauge of claim 14, wherein said depth gauge plate portion is disposed substantially normal to the plane of the body portion.

20. A depth gauge for a cutter device movable along a path for cutting a kerf in a workpiece in an upright position comprising a body portion of a selected thickness having a substantially upright central plane, a depth gauge plate portion cantilevered over said body portion and disposed at substantially a right angle relative to said plane, and a juncture section interconnecting said body portion and plate portion, said juncture section having an inner radius in a range of 0.5 to 2.0 times said selected thickness adjacent front and rear ends of the depth gauge.

21. The depth gauge of claim 20, wherein said juncture section is deformed laterally inwardly in a region intermediate said front and rear ends and has an inner radius greater than said first-mentioned radius adjacent said front and rear ends.

22. A depth gauge for a cutter device comprising
a body portion with opposed inner and outer face surfaces,
a depth gauge plate portion bent over in a cantilevered position above the inner face surface of the body portion, and
a gusset which is integrally formed with the body portion and depth gauge portion and which underlies and is connected to the underside of the depth gauge plate portion to provide support for said plate portion.

23. The depth gauge of claim 22, which is formed from plate material of a selected thickness and said gusset projects laterally from remainder portions of the inner face surface a distance at least 0.1 times said thickness.

24. The depth gauge of claim 22, which further comprises a juncture section interconnecting said body portion and depth gauge portion, said juncture section having forward and rearward ends, and a portion of the juncture section is deformed laterally from remainder portions of the juncture section in a region intermediate its forward and rearward ends to produce said support gusset.

25. The depth gauge of claim 24, which is formed from plate material of selected thickness and the deformation is in a range of 0.1 to 1.0 times the selected thickness.

26. The depth gauge of claim 25, wherein the deformation has a length measured longitudinally of said depth gauge which is in a range of from 1.5 to 5.0 times said selected thickness.

27. The depth gauge of claim 24, wherein the juncture section has a selected juncture length between its front and rear ends and said deformation has a length measured longitudinally of the depth gauge which is in a range of from 0.25 to 0.75 times said selected juncture length.

28. The depth gauge of claim 24, wherein said deformation as viewed from above is arcuate with the maximum deformation occurring substantially centrally between said front and rear ends.

29. The depth gauge of claim 24, wherein said deformed region comprises an indentation formed in a laterally outwardly facing surface of the juncture section forwardly of the rear edge of the depth gauge portion providing added side plate relief for the depth gauge.

30. The depth gauge of claim 29, wherein the laterally outwardly facing side surface of the juncture section is concavely curved as viewed from above.

31. The depth gauge of claim 24, wherein said deformation is substantially curvilinear throughout.

32. A cutting chain movable along a path for cutting a kerf in a workpiece, the cutting chain in an upright position having pivotally interconnected cutter links, drive links, and tie strap links, a cutter having a cutter portion thereon having a forwardly facing cutting edge at a selected elevation in the chain, and a depth gauge on one of said links leading said cutting edge, the depth gauge comprising an upright body portion having a substantially upright central plane and opposed upright faces on opposite sides of said plane, a depth gauge top plate portion cantilevered from said body portion extending at a substantial angle relative to said plane over one of said faces, and a juncture section interconnecting the body portion and top plate portion, said juncture section having front and rear ends, with a portion of the juncture section being deformed intermediate its ends to produce a projection extending laterally of remainder portions of the juncture section under said top plate portion and integrally joined thereto to provide support for said top plate portion.

33. The chain of claim 32, wherein said depth gauge is formed integrally on said cutter link.

34. The chain of claim 33, wherein said cutter link has said cutter portion disposed at a rear portion thereof and said depth gauge is formed on the forward portion thereof.

35. The chain of claim 32, wherein a cutter link and tie strap link are mounted in opposed positions on opposite sides of the longitudinal center line of the chain, the depth gauge is formed integrally on said tie strap link and the depth gauge top plate portion extends laterally across said centerline to lead the cutting edge of said cutter.

36. The chain of claim 32, wherein a drive link leads a cutter link in said chain and the depth gauge is formed integrally on said drive link and is positioned thereon to lead the cutting edge of the cutter.

\* \* \* \* \*

UNITED STATES PATENT AND TRADEMARK OFFICE
CERTIFICATE OF CORRECTION

PATENT NO. : 5,974,933

DATED : November 2, 1999

INVENTOR(S) : Burrows et al.

It is certified that error appears in the above-identified patent and that said Letters Patent is hereby corrected as shown below:

Column 5, line 34, "100°-170°" should be --110°-170°--.

Column 9, line 40, "Load L" should be --Load L1--.

Signed and Sealed this

Twenty-second Day of May, 2001

Attest:

NICHOLAS P. GODICI

*Attesting Officer*   *Acting Director of the United States Patent and Trademark Office*